United States Patent

Welch

(10) Patent No.: US 9,434,292 B2
(45) Date of Patent: Sep. 6, 2016

(54) TRAY SYSTEM FOR A TRUCK

(71) Applicant: Ford Global Technologies, LLC, Dearborn, MI (US)

(72) Inventor: Jeremy Welch, Warrandyte (AU)

(73) Assignee: FORD GLOBAL TECHNOLOGIES, LLC, Dearborn ( * ) Notice: Subject to any disclaimer, the term of this patent is extended or adjusted under 35 U.S.C. 154(b) by 0 days.

(21) Appl. No.: 14/228,956

(22) Filed: Mar. 28, 2014

(65) Prior Publication Data

US 2015/0274060 A1   Oct. 1, 2015

(51) Int. Cl.
*B60P 7/08*   (2006.01)
*B62D 25/20*   (2006.01)
*B62D 33/02*   (2006.01)

(52) U.S. Cl.
CPC ......... *B60P 7/0807* (2013.01); *B62D 25/2054* (2013.01); *B62D 33/02* (2013.01)

(58) Field of Classification Search
CPC .. B62D 25/2054; B62D 33/02; B60P 7/0807
USPC ...................................... 296/184.1
See application file for complete search history.

(56) References Cited

U.S. PATENT DOCUMENTS

| | | | | |
|---|---|---|---|---|
| 4,315,707 A | * | 2/1982 | Fernbach | B60P 7/12 410/107 |
| 5,836,605 A | * | 11/1998 | Bowling | B60P 7/12 105/382 |
| 7,530,618 B2 | | 5/2009 | Collins et al. | |
| 8,348,331 B2 | | 1/2013 | Holt | |
| 8,491,239 B2 | * | 7/2013 | Ferrari | B60P 7/12 410/30 |
| 8,523,271 B2 | * | 9/2013 | Castillo | 296/184.1 |
| 2006/0163296 A1 | * | 7/2006 | McMillan | 224/319 |
| 2012/0055967 A1 | | 3/2012 | McMillan | |

* cited by examiner

*Primary Examiner* — Glenn Dayoan
*Assistant Examiner* — Melissa A Black
(74) *Attorney, Agent, or Firm* — Jason C. Rogers; Brooks Kushman P.C.

(57) ABSTRACT

A system for accommodating a variety of modular components on a truck bed tray that is assembled to a truck frame. A plurality of first engagement features are provided to secure a heavier attachment to the bed. Each of the first engagement features includes a first receptacle and a first plug that may be inserted in the first receptacle. A plurality of second engagement features are provided to secure a relatively lighter weight attachment to the bed. Each of the second engagement features includes a second receptacle and a second plug that may be inserted in the second receptacle.

20 Claims, 4 Drawing Sheets

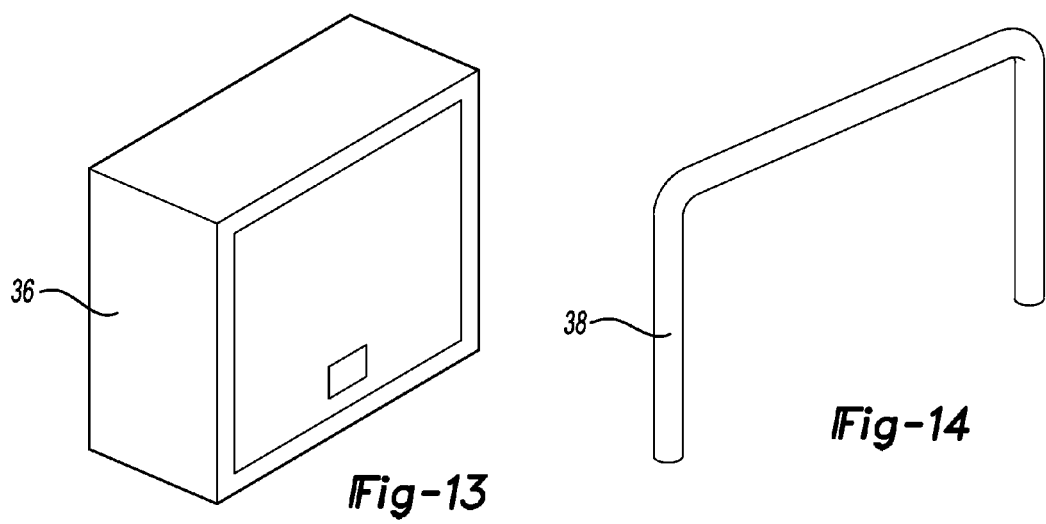
Fig-13
Fig-14
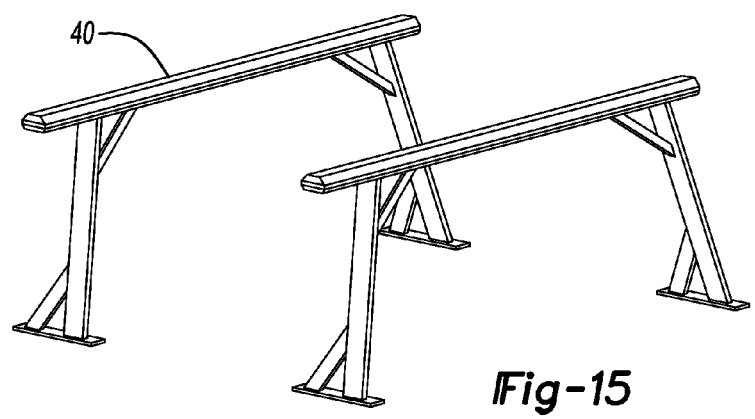
Fig-15
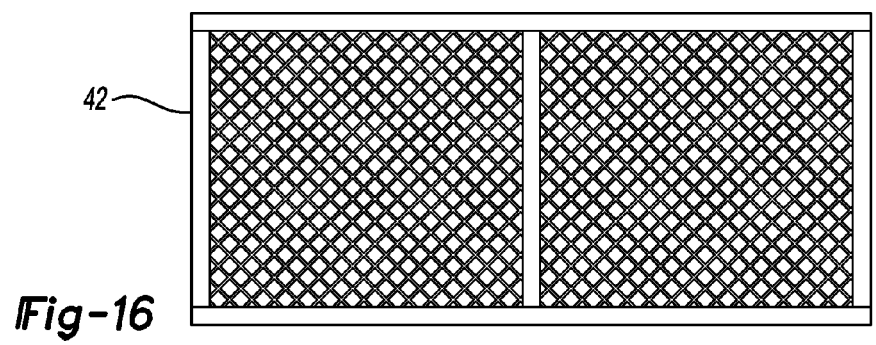
Fig-16

TRAY SYSTEM FOR A TRUCK

TECHNICAL FIELD

This disclosure relates to a system for accommodating a variety of modular components on a tray that is assembled to a truck frame.

BACKGROUND

Trucks, and in particular pick-up trucks, are used as work vehicles in many industries. Aftermarket truck body building companies customize standardized pick-up trucks to include many different adaptations such as tool boxes, cages, cranes, fuel or water tanks, and many other devices may be attached.

One potential problem with aftermarket modifications is that the truck bed may be modified to allow overloading the rear axle. If heavy articles such as tool boxes or tanks are positioned too far rearward in the truck bed, the ride characteristics, steering and stability can be adversely affected. Water can become entrained in the vehicle fuel tank due to filler and breather locations being improperly oriented. The vehicle differential can also be adversely affected.

Several different pick-up truck body styles are provided including a single cab, an extended cab and a crew cab. Each body style is generally provided on the same frame and, as a result, the length of the truck bed is shorter with an extended cab and even shorter with a crew cab. Generally, the shorter the truck bed the more likely excessive loading will occur over the rear axle and behind the center of gravity of the vehicle. Larger cabs have less space available behind the cab and in front of the center of gravity of the vehicle.

The above problems and other problems are addressed by this disclosure as summarized below.

SUMMARY

According to one aspect of this disclosure, a modular truck bed construction system is provided for a truck that comprises a tray defining A-type receptacles and B-type receptacles. A first set of modules that have a loaded weight more than WL and include A-type connectors that are assembled to the A-type receptacles. A second set of modules have a loaded weight less than WL, and include B-type connectors that are assembled to the B-type receptacles, and wherein A-type connectors cannot be assembled to the B-type receptacles.

According other aspects of this disclosure, the B-type connectors may be configured to be able to be assembled to A-type receptacles. Different approaches may be taken to make the A-type receptacles/connectors and the B-type receptacles/connectors different from each other. For example, A-type receptacles may be larger than B-type receptacles and the A-type connectors may be larger than the B-type connectors. The A-type receptacles have a different configuration than B-type receptacles and the A-type connectors have a different configuration than the B-type connectors. The A-type receptacles may be openings in the tray and the B-type receptacles may be openings in the tray that have a different configuration that the A-type receptacles, and wherein the A-type connectors may be protrusions on the first set of modules and the B-type connectors may be protrusions that have a different configuration than the A-type connectors. For example, the A-type receptacles may be square openings in the tray and the B-type receptacles may be circular openings in the tray. If so, the A-type connectors may be square protrusions on the first set of modules and the B-type connectors may be circular protrusions. The B-type connectors may be received in either A-type receptacles or B-type receptacles.

According to other aspects of this disclosure, the first set of modules may a tool box, an explosive cabinet, a fuel tank, a water tank, or a crane. The first set of modules have an expected or planned gross weight including the weight of the modules and an estimated full weight rating, "Weight Loaded" (WL) that may be, for example 200 kg. The second set of modules may be a cage, a load rest, a fire tender, a ladder rack, a timber rack, or a first aid box. The second set of modules may have an expected weight of less than WL.

The truck has a frame that includes a plurality of frame rails and wherein the tray is adapted to be attached directly to the frame rails.

According to another aspect of this disclosure as it relates to a vehicle, a vehicle having a frame, a rear axle and a truck bed is disclosed that may be customized with different types of attachments. A first attachment and a second attachment that is rated to have a lower gross weight than the first attachment are adapted to be secured to the truck bed. A first engagement feature is provided for securing the first attachment to the bed and a second engagement feature is provided for securing the second attachment to the bed. The first engagement features limit positioning the first attachment to a predetermined location.

According to other aspects of this disclosure as it relates to a vehicle, a plurality of first engagement features are provided to secure the first attachment to the bed. Each of the first engagement features includes a first receptacle and a first plug that may be inserted in the first receptacle. A plurality of second engagement features are provided to secure the second attachment to the bed. Each of the second engagement features includes a second receptacle and a second plug that may be inserted in the second receptacle.

The first plugs are different from the second plugs to prevent the first plugs from being inserted into the second receptacles. For example, the first engagement features may be larger than the second engagement features to prevent the first engagement features from engaging the second engagement features.

Alternatively, the first engagement features may include polygonal fitting parts and the second engagement features include circular fitting parts to prevent the first engagement features from engaging the second engagement features. The circular fitting parts may be adapted to engage the polygonal fitting parts.

The above aspects and other aspects of this disclosure are described in greater detail below with reference to the attached drawings.

BRIEF DESCRIPTION OF THE DRAWINGS

FIG. 13 is a side elevation view of an explosive cabinet or first aid box;

FIG. 14 is a perspective view of a load rest or protection hoop;

FIG. 15 is a diagrammatic view of a ladder rack or timber rack; and

FIG. 16 is a diagrammatic view of a modular cage.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
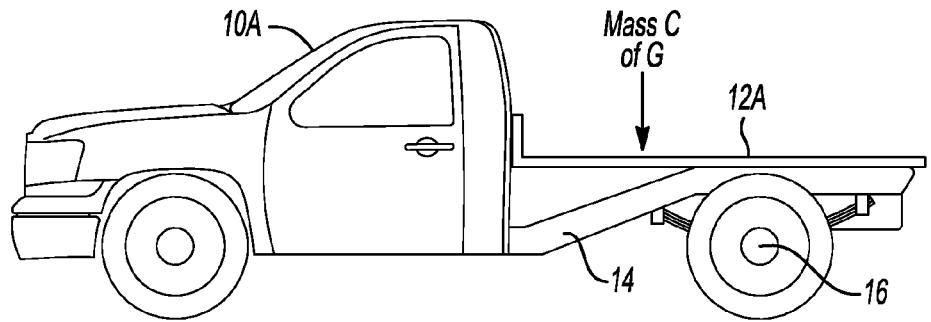
FIG. 1 is a side elevation view of a single cab truck with a truck bed tray.

Referring to FIG. 1, a single cab truck 10A is illustrated that is provided with a long tray 12A. The long tray 12A is attached to the frame rails 14, or frame, above the rear axle 16 of the truck 10A.

Figure 2:
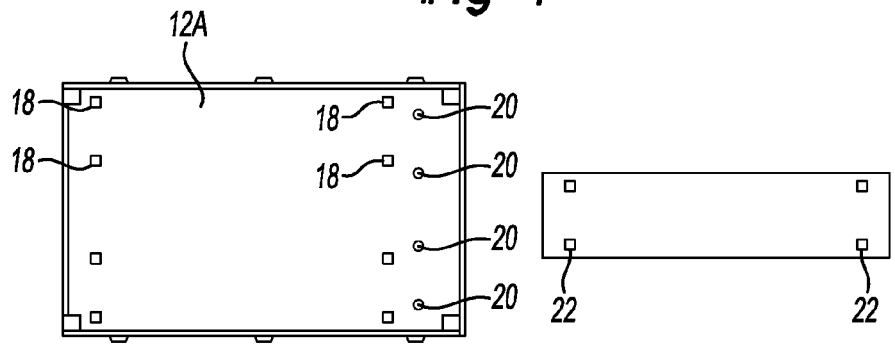
FIG. 2 is a top plan view of a single cab truck bed tray and a bottom plan view of a tool box removed from the truck bed tray.

Referring to FIG. 2, a long tray 12A is illustrated that includes type-A receptacles 18 that may be polygonal openings, or square openings. Type-B receptacles 20 are also shown to be provided in the tray 12A. A large tool box 24 is shown inverted to illustrate the type-A connectors 22 that are adapted to be received in the A-type receptacles 18. The connectors 22 may also be referred to herein as engagement features, plugs, or polygonal projections. The large tool box 24 is a relatively heavy attachment and may also be referred to as a heavy component. Two heavy attachment large tool boxes 24 may be assembled to extend in a longitudinal direction on both sides of the truck 10A.

Figure 3:
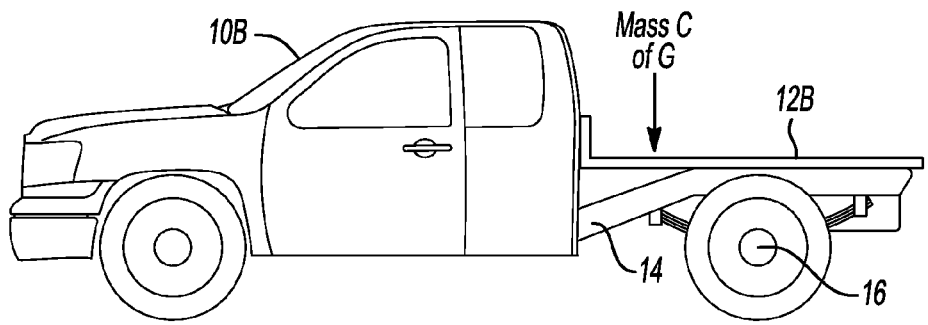
FIG. 3 is a side elevation view of an extended cab truck with a truck bed tray.

Referring to FIG. 3, an extended cab truck 10B is illustrated with an intermediate length tray 10B that is assembled to the truck 12B above the rear axle 16 on the frame rail 14. Single cab trucks 10A and extended cab trucks 10B generally have sufficient space between the back of the cab and the center of gravity of the truck to receive two heavy attachments as will be defined below. For example, two large tool boxes or a tool box and a fuel tank may be attached to the truck bed tray forward of the rear axle.

Figure 4:
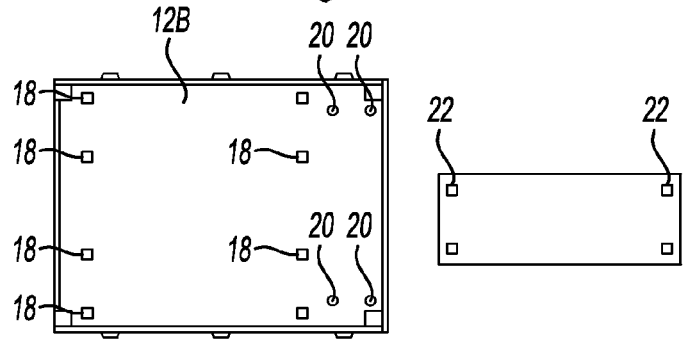
FIG. 4 is a top plan view of an extended cab truck bed tray and a bottom plan view of a tool box removed from the truck bed tray.

Referring to FIG. 4, an intermediate tray 12B includes type-A and type-B receptacles 18 and 20, respectively, as previously described with reference to FIG. 2. Type-A connectors are also shown to be provided on the heavy component.

The truck bed tray may be adapted to receive a wide variety of different types of attachments that may be generally categorized as heavy attachments and light attachments. The weight of the attachments includes both the structure of the attachment and its anticipated contents. The attachments may be evaluated based upon their anticipated gross weight or, in other words, may be referred to as a loaded weight (WL).

The various categories of attachments may be divided based upon their weight WL. The weight of a heavy attachment is one that is defined as weighing more than WL when fully loaded. The weight of a small or lightweight attachment may be referred to as being less than WL. The determination of is based upon the specific load carrying characteristics of a given truck but may for example be 300 kg.

Figure 5:
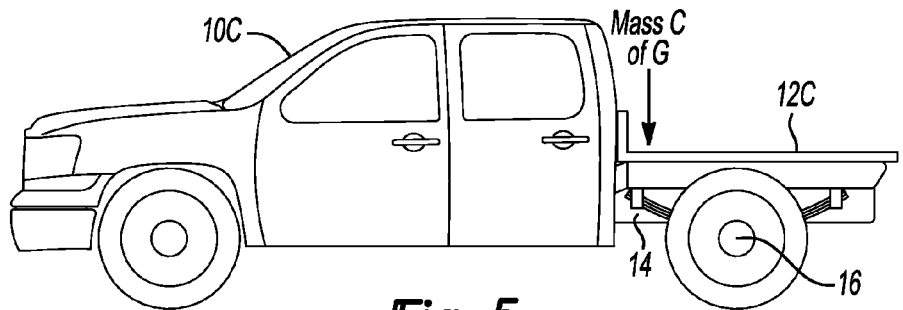
FIG. 5 is a side elevation view of a crew cab truck with a truck bed tray.

Referring to FIG. 5, a crew cab truck 10C is shown with a short tray 12C shown prior to assembly to the truck 10C. The truck bed 12C is considerably shorter than the long tray 10A. The front of the short tray 12C is just forward of the mass center of gravity for the truck 10C. Crew cab trucks 10C would be provided with a single set of heavy attachment receptacles aligned in the transverse vehicle direction and could accommodate one tool box or fuel tank.

Figure 6:
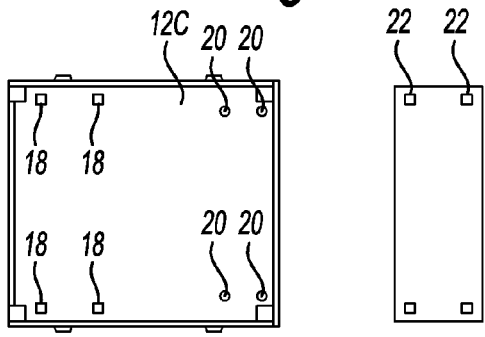
FIG. 6 is a top plan view of a crew cab truck bed tray and a bottom plan view of a tool box removed from the truck bed tray.

Referring to FIG. 6, the short tray 12C is illustrated with a large toolbox exploded away and shown in an inverted position to illustrate the location of the A-type connectors that are adapted to be received in the A-type receptacles in the short tray 12C. The short tray 12C also includes the B-type receptacles or round holes that are generally located behind the rear axle and mass center of gravity of the vehicle.

Figure 7:
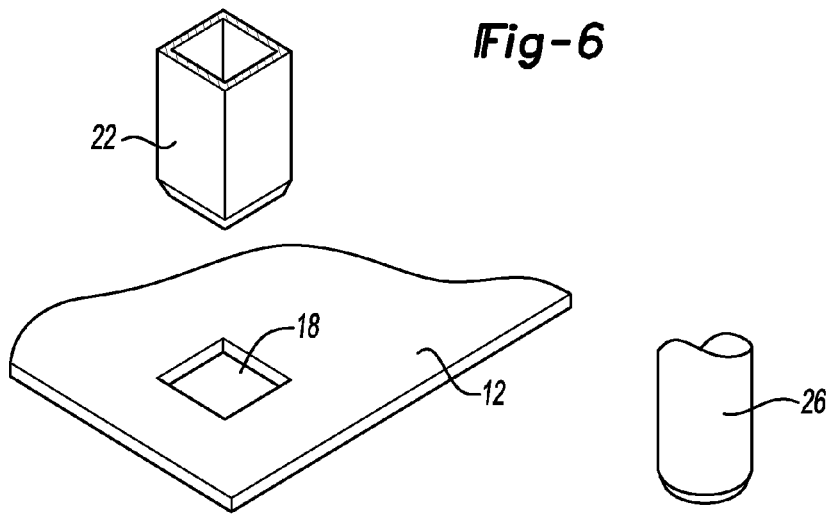
FIG. 7 is a fragmentary exploded perspective view of a truck bed tray including a receptacle and a connector exploded away from the receptacle in the truck bed tray.

Referring to FIG. 7, a portion of a truck bed tray 12 is illustrated that may be a long tray 12A, an intermediate tray 12B or a short tray 12C. An A-type receptacle 18 is defined by the bed 12 and in the illustrated embodiment is a polygonal or square opening. The accessory to be attached to the A-type receptacles includes an A-type connector. The A-type connector may be referred to as an engagement feature, a plug or a polygonal projection. Generally, A-type connectors are provided on heavier accessories that have a weight greater than W1 when fully loaded.

Figure 8:
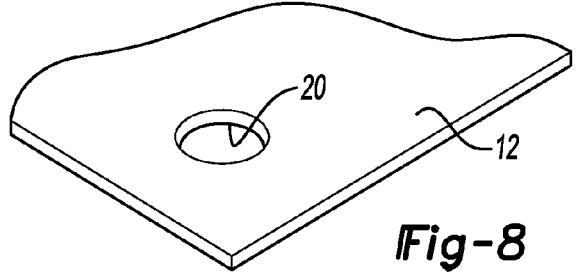
FIG. 8 is a fragmentary exploded perspective view of a truck bed tray having another type of receptacle and a connector.

Referring to FIG. 8, a bed 12 is partially shown that includes a B-type receptacle or round hole. The round hole 20 is adapted to receive a B-type connector or round projection 26. The round projections 26 are preferably attached to lighter weight attachments that have an anticipated or loaded gross weight less than W1.

Many different types of receptacles and connectors may be provided in a wide variety of shapes and sizes. In one alternative embodiment, a B-type connector 26 may be received in either a B-type receptacle as shown, or may also be received in an A-type receptacle 18, as shown in FIG. 6. In this way, the B-type connector may be received in either type of receptacle while the A-type receptacle is not of the proper size or shape to be received in the B-type receptacle 20. One object of the invention is to prevent heavier weight attachments from being attached to the vehicle at a location too far behind the center of gravity, placing a lighter weight attachment forward of the rear axle 16 or center of gravity.

Referring to FIGS. 9-16, a wide variety of attachments may be incorporated into a complete modular truck bed system. The attachments may be categorized into different anticipated gross weight categories based upon the weight of the attachments and their contents when fully loaded as designed.

Figure 9:
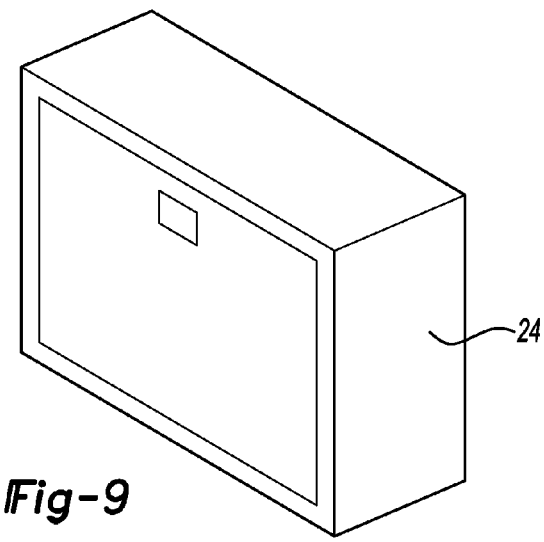
FIG. 9 is a perspective view of a large tool box.

Referring to FIG. 9, a large tool box 24 is illustrated that would be categorized to be provided with heavy weight attachment features.

Figure 10:
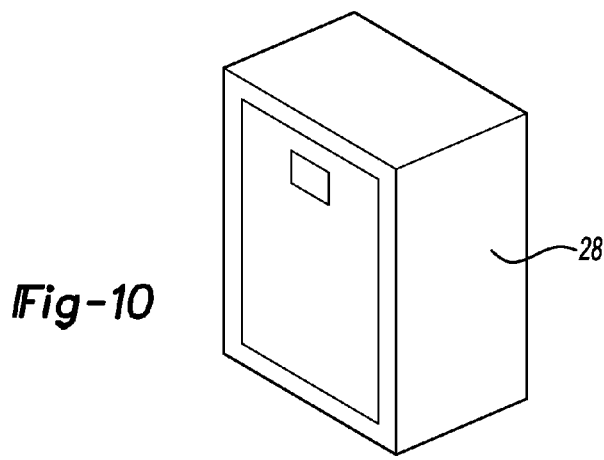
FIG. 10 is a perspective view of a small tool box.

Referring to FIG. 10, a small tool box 28 is illustrated and would most likely be categorized as a lightweight attachment but depending upon the intended use could alternatively be categorized as a heavy weight attachment.

Figure 11:
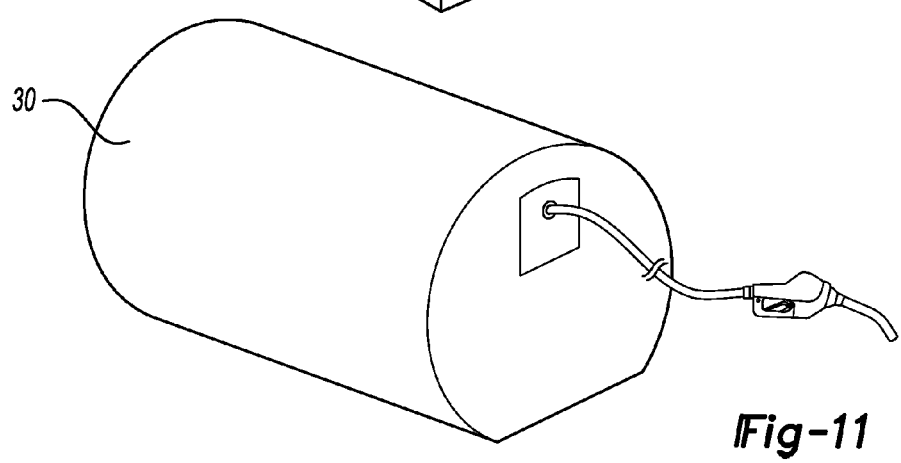
FIG. 11 is a diagrammatic view of a water/fuel tank.

Referring to FIG. 11, a water/fuel tank 30, or bowser, is illustrated that is expected to be a relatively heavy weight attachment.

Figure 12:
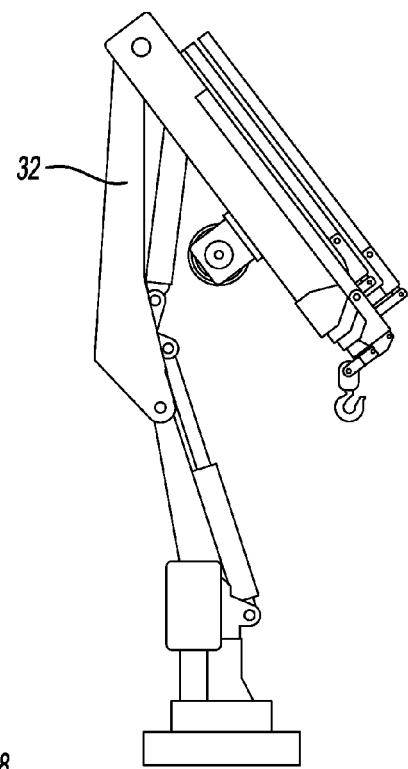
FIG. 12 is a diagrammatic view of a crane or work vice.

Referring to FIG. 12, an optional crane or work vice 32 is shown that is also anticipated to be a large gross vehicle weight attachment due to the expected weight to be lifted by the crane 32.

Referring to FIG. 13, a blast box or first aid box 36 is shown that may be either a lightweight attachment or a heavy attachment depending upon the intended contents of the box 36.

Referring to FIG. 14, a load rest or protection hoop 38 is shown that may be attached to the vehicle and is categorized as a lightweight attachment, but may be attached at any location where it may be necessary to complete the truck bed design. Similarly side walls and end walls may be provided that may be attached at any desired location and would be provided with B-type connectors or the like.

Referring to FIG. 15, a ladder rack/timber rack 40 is shown that is used to carry ladders or timber and may also be categorized as either a lightweight or a heavy accessory.

Referring to FIG. 16, a cage module 42 is shown that is most likely categorized as a lightweight attachment and would be appropriate to locate in any part of the truck bed tray assembly.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A modular bed system for a truck comprising:
   a tray connected to frame rails of the truck and defining A-receptacles and B-receptacles;
   a first module defining A-plugs extending from the first module and received in the A-receptacles; and
   a second module defining B-plugs extending from the second module and received in the B-receptacles, wherein the first module has a higher loaded weight than the second module and the A-plugs cannot be assembled to the B-receptacles.

2. The modular bed system of claim 1 wherein the B-plugs can be assembled to A-receptacles.

3. The modular bed system of claim 1 wherein the A-receptacles are larger than the B-receptacles and the A-plugs are larger than the B-plugs.

4. The modular bed system of claim 1 wherein the A-receptacles have a different configuration than the B-receptacles and the A-plugs have a different configuration than the B-plugs.

5. The modular bed system of claim 1 wherein the A-receptacles and the A-plugs have mating shapes that telescopically engage, and the B-receptacles and the B-plugs have mating shapes that telescopically engage.

6. The modular bed system of claim 1 wherein the A-receptacles are polygonal openings in the tray and the B-receptacles are circular openings in the tray, and wherein the A-plugs are polygonal protrusions and the B-plugs are circular protrusions.

7. The modular bed system of claim 6 wherein the B-plugs may be received in either the A-receptacles or the B-receptacles.

8. The modular bed system of claim 1 wherein the first module is selected from the group consisting of:
   a tool box;
   an explosive cabinet;
   a fuel tank;
   a fire tender;
   a water tank; and
   a crane.

9. The modular bed system of claim 1 wherein the second module is selected from the group consisting of:
   a cage;
   a load rest;
   a ladder rack;
   a timber rack; and
   a first aid box.

10. The modular bed system of claim 1 wherein the first module is a first set of modules and the second module is a second set of modules.

11. A truck comprising:
    a rear axle;
    a frame; and
    a bed supported above the rear axle and connected to the frame, and defining A-receptacles all forward of the rear axle and configured to receive A-protrusions of a first module, and defining B-receptacles configured to receive B-protrusions of a second module, and wherein the B-receptacles cannot receive the A-protrusions so that the first module can only be secured to the bed forward of the rear axle.

12. The vehicle of claim 11 wherein the first module has a higher gross weight than the second module.

13. The vehicle of claim 11 wherein the A-receptacles have a different shape than the B-receptacles.

14. The vehicle of claim 11 wherein the A-receptacles are larger than the B-receptacles.

15. The vehicle of claim 11 wherein the A-receptacles are polygonal and the B-receptacles are circular.

16. The vehicle of claim 11 wherein the A-receptacles and the A-protrusions have mating shapes that telescopically engage when the first module is installed on the bed, and the B-receptacles and the B-protrusions have mating shapes that telescopically engage when the second module is installed on the bed.

17. The vehicle of claim 11 wherein the first module is selected from the group consisting of:
    a tool box;
    an explosive cabinet;
    a fuel tank;
    a fire tender;
    a water tank; and
    a crane.

18. The vehicle of claim 11 wherein the second module is selected from the group consisting of:
    a cage;
    a load rest;
    a ladder rack;
    a timber rack; and
    a first aid box.

19. The vehicle of claim 11 wherein the first module is disposed on the bed with the A-protrusions disposed in the A-receptacles, and the second module is disposed on the bed with the B-protrusions disposed in the B-receptacles.

20. The vehicle of claim 11 wherein the truck bed is directly attached to the frame.

* * * * *